(12) United States Patent
George

(10) Patent No.: US 8,408,850 B2
(45) Date of Patent: Apr. 2, 2013

(54) TWIST DRILL WITH NEGATIVE AXIAL RAKE TRANSITION BETWEEN THE LIP AND THE SECONDARY CUTTING EDGE

(75) Inventor: Stephen Michael George, Evans, GA (US)

(73) Assignee: Kennametal Inc., Latrobe, PA (US)

( * ) Notice: Subject to any disclaimer, the term of this patent is extended or adjusted under 35 U.S.C. 154(b) by 892 days.

(21) Appl. No.: 12/485,166

(22) Filed: Jun. 16, 2009

(65) Prior Publication Data

US 2010/0316456 A1     Dec. 16, 2010

(51) Int. Cl.
    *B23B 51/02*     (2006.01)
(52) U.S. Cl. .................................... 408/230; 408/227
(58) Field of Classification Search ............ 408/230, 408/227; *B23B 51/02, 51/00*
See application file for complete search history.

(56) References Cited

U.S. PATENT DOCUMENTS

| | | | |
|---|---|---|---|
| 2,778,252 A * | 1/1957 | Oxford, Jr. ................ | 408/230 |
| 4,116,580 A * | 9/1978 | Hall et al. ................. | 408/230 |
| 4,222,690 A | 9/1980 | Hosoi | |
| 4,381,162 A | 4/1983 | Hosoi | |
| 4,561,813 A | 12/1985 | Schneider | |
| 4,688,972 A * | 8/1987 | Kubota ..................... | 408/230 |
| 4,826,368 A | 5/1989 | Tikal et al. | |
| 5,088,863 A | 2/1992 | Imanaga et al. | |
| 5,230,593 A * | 7/1993 | Imanaga et al. ............ | 408/230 |
| 5,236,291 A | 8/1993 | Agapiou et al. | |
| 5,423,640 A | 6/1995 | Lindblom et al. | |
| 5,486,075 A | 1/1996 | Nakamura et al. | |
| 5,716,172 A | 2/1998 | Nakamura et al. | |
| 6,036,410 A | 3/2000 | Shun'ko | |
| 6,056,486 A | 5/2000 | Colvin | |
| 6,158,304 A | 12/2000 | Packer et al. | |
| 6,739,809 B2 | 5/2004 | Shaffer | |
| 6,916,139 B2 | 7/2005 | Yanagida et al. | |
| 6,923,602 B2 * | 8/2005 | Osawa et al. .............. | 408/230 |
| 6,976,815 B2 | 12/2005 | Berglöw et al. | |
| 6,988,859 B2 | 1/2006 | Borschert et al. | |
| 7,001,120 B2 | 2/2006 | Moser et al. | |
| 7,140,815 B2 | 11/2006 | George et al. | |
| 7,241,085 B2 | 7/2007 | Frisendahl | |
| 7,314,102 B2 | 1/2008 | Magin | |

(Continued)

FOREIGN PATENT DOCUMENTS

| | | | |
|---|---|---|---|
| DE | 4403300 A1 * | 8/1995 | |
| JP | 06320316 A * | 11/1994 | |

(Continued)

*Primary Examiner* — Daniel Howell
*Assistant Examiner* — Justin Sikorski
(74) *Attorney, Agent, or Firm* — Larry R. Meenan, Esq.

(57) ABSTRACT

A drill for making a hole within a workpiece has a body extending along a longitudinal axis, at least one flute extending along the body, and a drill point extending from the end of the body. The drill point has a periphery and is comprised of a chisel edge, a primary cutting edge extending inwardly from the periphery, a secondary cutting edge extending outwardly from the chisel edge, and a tertiary cutting edge connecting the primary cutting edge with the secondary cutting edge, wherein the tertiary cutting edge has a negative axial rake angle. A method for producing such a drill point is also disclosed wherein in one grinding pass a gash forms the axial rake angle of the secondary cutting edge, and in a separate grinding pass a portion of the secondary cutting edge is removed to produce a tertiary cutting edge having an axial rake angle that is negative.

9 Claims, 9 Drawing Sheets

U.S. PATENT DOCUMENTS

| | | |
|---|---|---|
| 7,338,237 B2 | 3/2008 | Frejd |
| 7,520,703 B2 | 4/2009 | Rompel |
| 7,789,599 B2 * | 9/2010 | Takikawa .................. 408/230 |
| 2003/0053873 A1 | 3/2003 | Shaffer |
| 2003/0129031 A1 | 7/2003 | Mast et al. |
| 2003/0175086 A1 | 9/2003 | Muhlfriedel et al. |
| 2003/0188895 A1 | 10/2003 | Osawa et al. |
| 2005/0249562 A1 | 11/2005 | Frejd |
| 2006/0039767 A1 * | 2/2006 | Yamamoto et al. ......... 408/230 |
| 2006/0171787 A1 | 8/2006 | Lindblom |
| 2007/0081870 A1 | 4/2007 | Muhlfriedel et al. |
| 2007/0160437 A1 | 7/2007 | Shultz et al. |
| 2008/0166196 A1 | 7/2008 | Zhu |
| 2008/0199268 A1 | 8/2008 | Krenzer et al. |
| 2009/0087275 A1 | 4/2009 | Goulbourne |

FOREIGN PATENT DOCUMENTS

| | | |
|---|---|---|
| JP | 2001-096416 | 4/2001 |
| JP | 2003285211 A * | 10/2003 |

* cited by examiner

TWIST DRILL WITH NEGATIVE AXIAL RAKE TRANSITION BETWEEN THE LIP AND THE SECONDARY CUTTING EDGE

BACKGROUND OF THE INVENTION

1. Field of the Invention

The subject invention is directed to a twist drill and in particular to the transition between the primary cutting edge (lip) and the secondary cutting edge of the drill point of a twist drill.

2. Description of Related Art

Twist drills are typically fabricated through grinding operations utilizing a grinding wheel moved about a blank in a predetermined pattern to create the relatively complicated geometries found on such drills. In particular, major surfaces of the drill point result through the fabrication of the flute and an associated gash adjacent to the flute.

Directing attention to FIGS. 1-3, a typical prior art drill 5 has a body 10 extending along a longitudinal axis 15 and a drill point 20 extending from the end 12 of the body 10. At least one flute 25, formed with a first grinding operation, extends along the body 10 and terminates at the drill point 20. The intersection of the flute 25 with the drill point 20 creates a primary cutting edge or lip 30. The drill point 20 is further defined by a chisel edge 35 extending outwardly from the longitudinal axis 15 to a chisel edge outer end 40. Extending from the chisel edge outer end 40 is a secondary cutting edge 45. This secondary cutting edge 45 is formed through a second grinding operation which produces a gash 50 and not only forms the secondary cutting edge 45, but provides to the secondary cutting edge 45a positive axial rake angle. The drill 5 illustrated in FIGS. 1-3 has a pair of flutes 25, a pair of primary cutting edges 30 and a pair of secondary cutting edges 45. For clarity, only one side of the drill will be discussed and, therefore, only one set of elements will be discussed with the understanding that the other set of elements are symmetric with the first set of elements in the pair.

The lip or primary cutting edge 30 is produced through the same grinding pass used to generate the flute 25 and the secondary cutting edge 45 is produced with a second grinding pass which concurrently generates the gash 50. However, this creates a discontinuity 55 created at the intersection of the primary cutting edge 30 and the secondary cutting edge 45. As a result of this discontinuity 55, as the drill rotates in direction R, the discontinuity 55 contacts the workpiece and material accumulates about the discontinuity 55 to create an undesirable built-up edge. Not only does this built-up edge hinder the cutting operation but, furthermore, acts as a source of concentrated heat which over time thermally degrades the surface of the drill point.

Typically the primary cutting edge 30 may have an axial rake angle Y of between 0 and 10 degrees, while the secondary cutting edge 45 will have a positive axial rake angle which is dependent upon the helix angle of the flute. For a straight flute, the helix angle will be zero. Depending upon the relationship of these two cutting edges, the discontinuity 55 may be further exaggerated such that when the primary cutting edge 30 has a high positive axial rake angle and the secondary cutting edge 45 has a neutral or positive rake angle, the intersection of these two cutting edges may create an even more prominent discontinuity 55 susceptible to producing built-up edges.

A design is needed to continue to provide the benefits offered by the positive rake angle of the primary cutting edge and the rake angle of the secondary cutting edge but to provide such benefits without the discontinuity which is counterproductive to these desirable drill features.

BRIEF SUMMARY OF THE INVENTION

A drill for making a hole within a workpiece has a body extending along a longitudinal axis, at least one flute extending along the body, and a drill point extending from the end of the body. The drill point has a periphery and end segments about the longitudinal axis. Each segment has a chisel edge extending outwardly from the longitudinal axis to a chisel edge outer end, a primary cutting edge extending inwardly from the periphery, a secondary cutting edge extending outwardly from the chisel edge outer end, wherein the secondary cutting edge has a positive or neutral axial rake angle, and a tertiary cutting edge connecting the primary cutting edge with the secondary cutting edge, wherein the tertiary cutting edge has a negative axial rake angle.

A method for producing such a drill involves the steps of 1) in one grinding pass, grinding a gash which forms the rake angle of the secondary cutting edge, and 2) in a separate grinding pass, grinding a portion of the secondary cutting edge to produce a tertiary cutting edge having an axial rake angle that is negative.

DETAILED DESCRIPTION OF THE INVENTION

Figure 4:
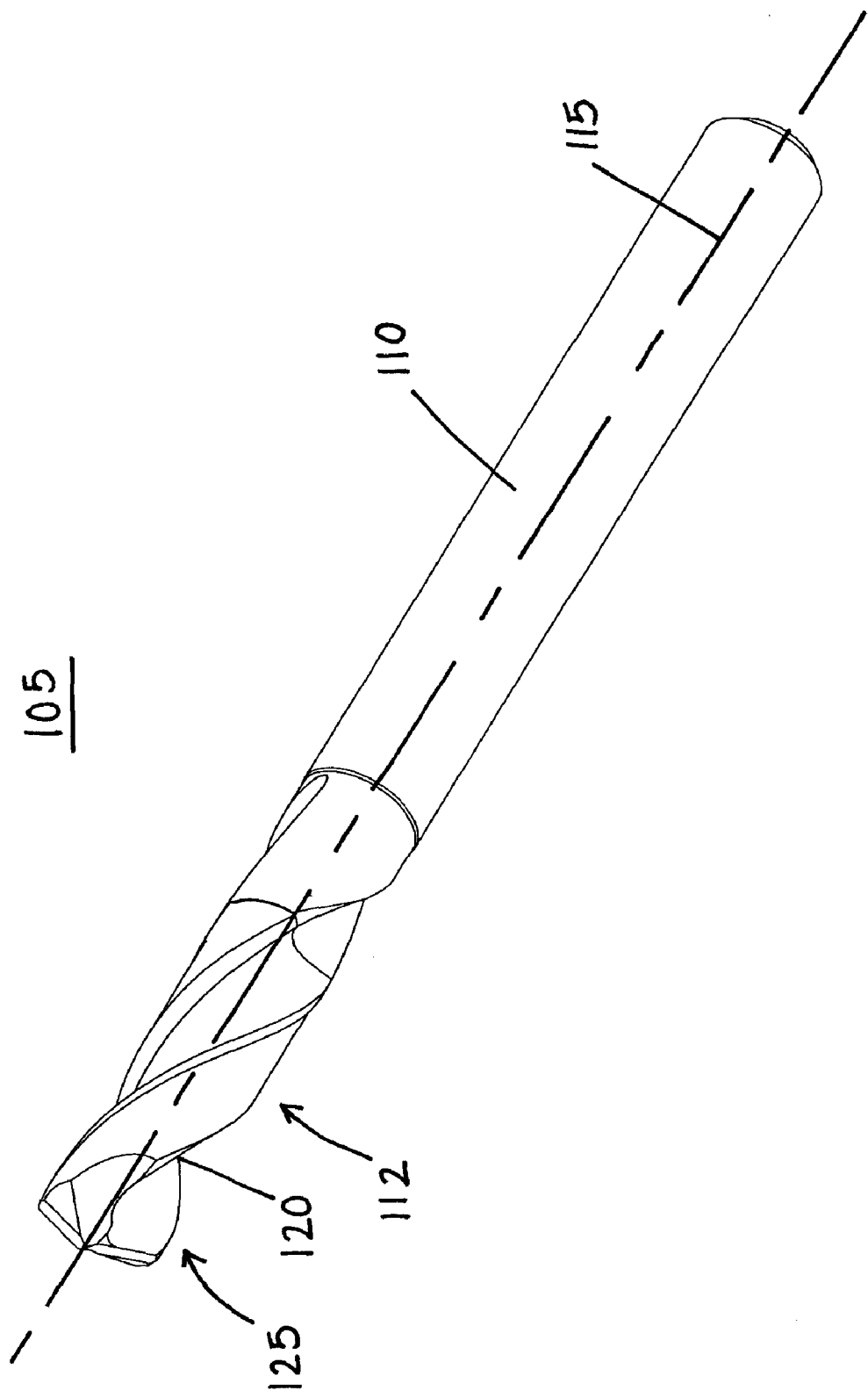
FIG. 4 is a perspective view of the twist drill in accordance with the subject invention.
Figure 5:
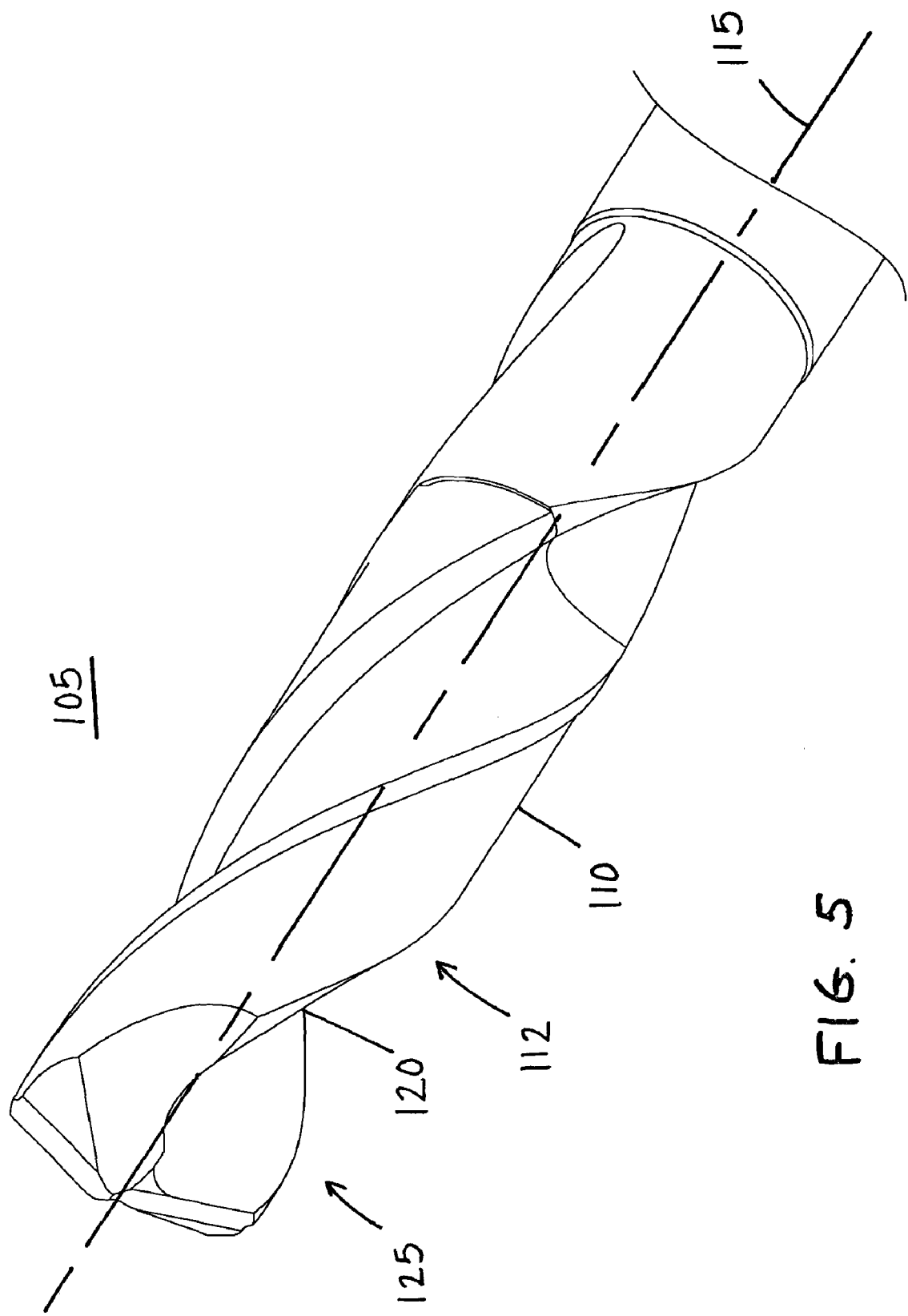
FIG. 5 is an enlarged view of the drill point of the drill illustrated in FIG. 4.
Figure 6:
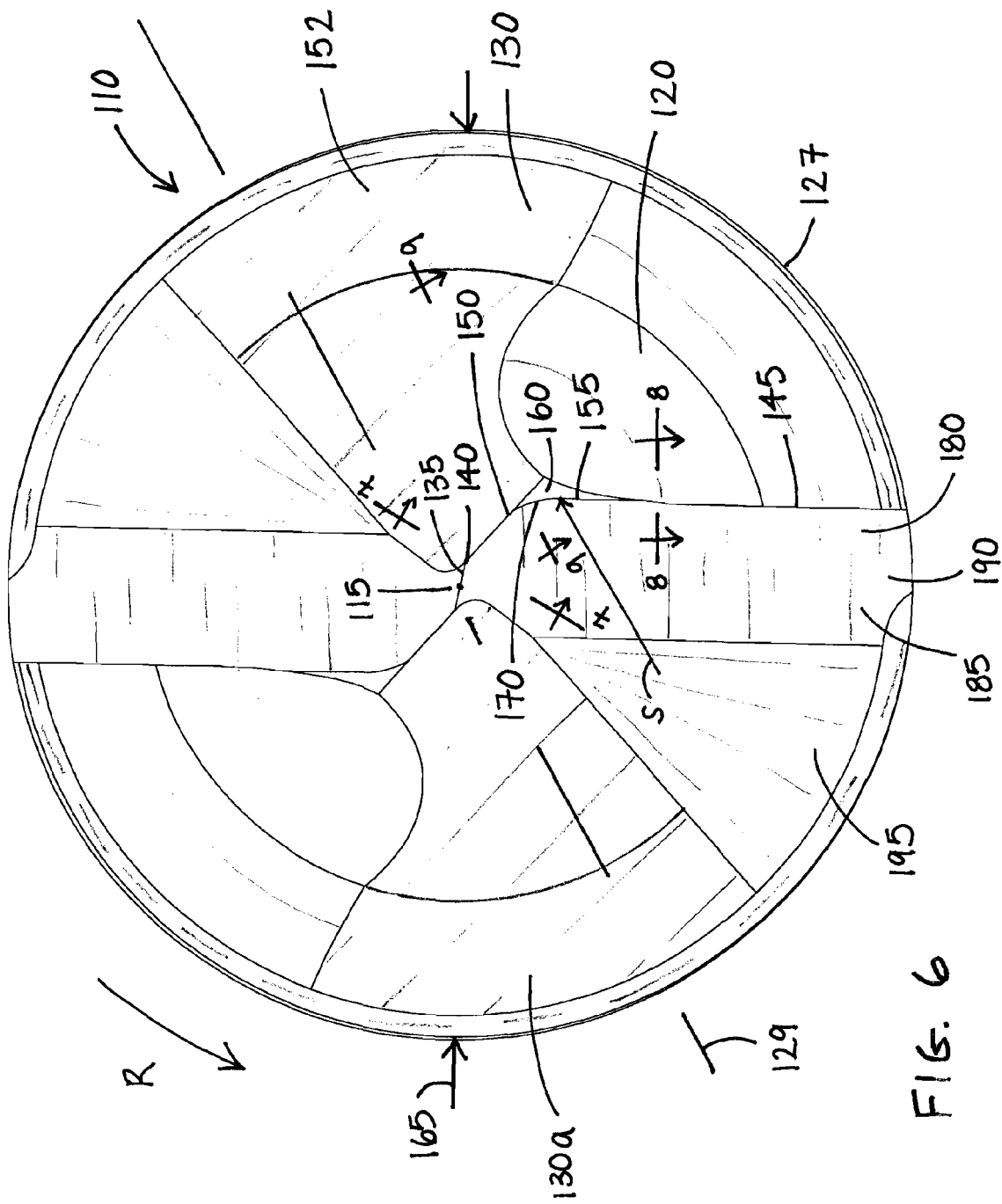
FIG. 6 is an end view of the drill illustrated in FIG. 4.

FIGS. 4 and 5 illustrate a perspective view of a drill in accordance with the subject invention while FIG. 6 illustrates an end view of that same drill.

In particular, FIGS. 4-6 illustrate a drill 105 for making a hole within a workpiece. The drill 105 has a body 110 extending along a longitudinal axis 115. At least one flute 120 extends along the body 110. However, the subject invention is applicable to drills with up to four flutes. Just as before, for clarity, only the cutting edges associated with one flute will be discussed with the understanding that the cutting edges associated with the opposing flute are symmetric. In particular, end segment 130 (FIG. 6) is defined by the area above line 129 and to the right of the first primary cutting edge 145, the secondary cutting edge 150 and the tertiary cutting edge 155. As can be seen, another end segment 130a exists above line 129 and to the left of the cutting edges but will not be discussed with the understanding that the description of end segment 130 is adequate.

Figure 7:
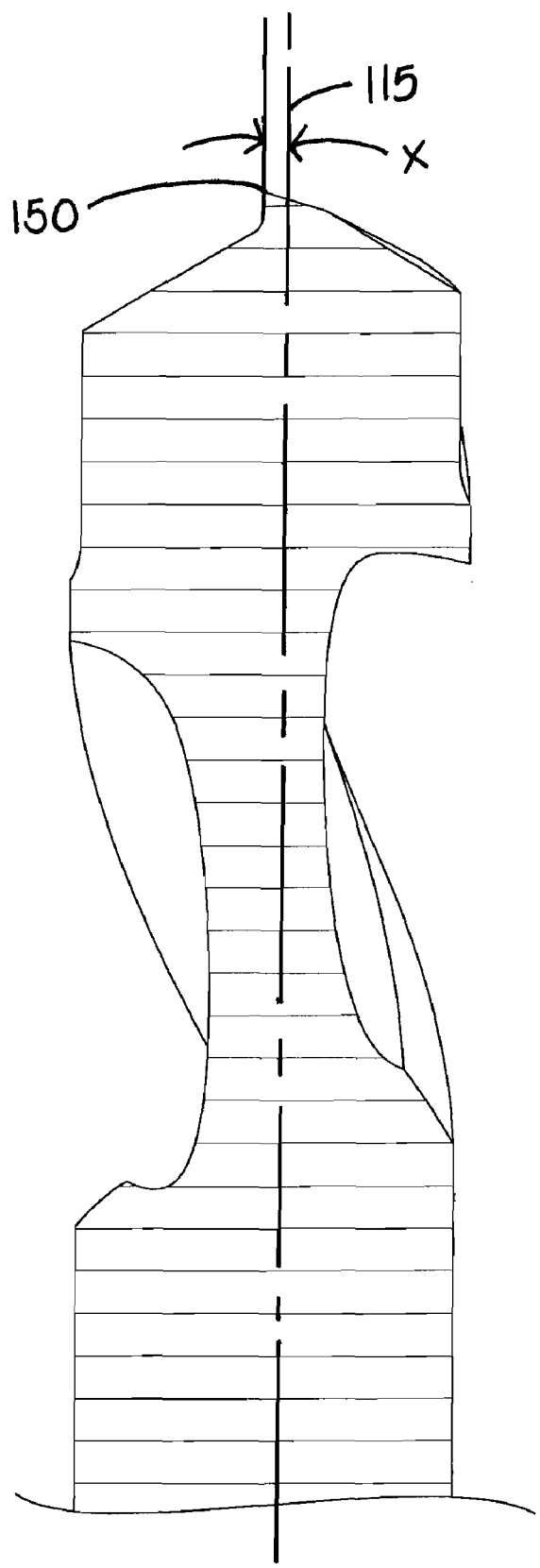
FIG. 7 is a section view along line "7-7" in FIG. 6.

A drill point 125 extends from the end 112 of the body 110. The drill point 125 has a periphery 127 (FIG. 6) and end segments 130, 130a about a longitudinal axis 115. Each end segment 130, 130a is comprised of a chisel edge 135 extending outwardly from the longitudinal axis 115 to a chisel edge outer end 140. A primary cutting edge 145 extends inwardly from the periphery 127. A secondary cutting edge 150 extends outwardly from the chisel edge outer end 140. Directing attention to FIG. 7, which is a cross-section along line "7-7" in FIG. 6, the secondary cutting edge 150 has a positive or neutral axial rake angle X, which may have a value of between 0 and 10 degrees.

Figure 8:
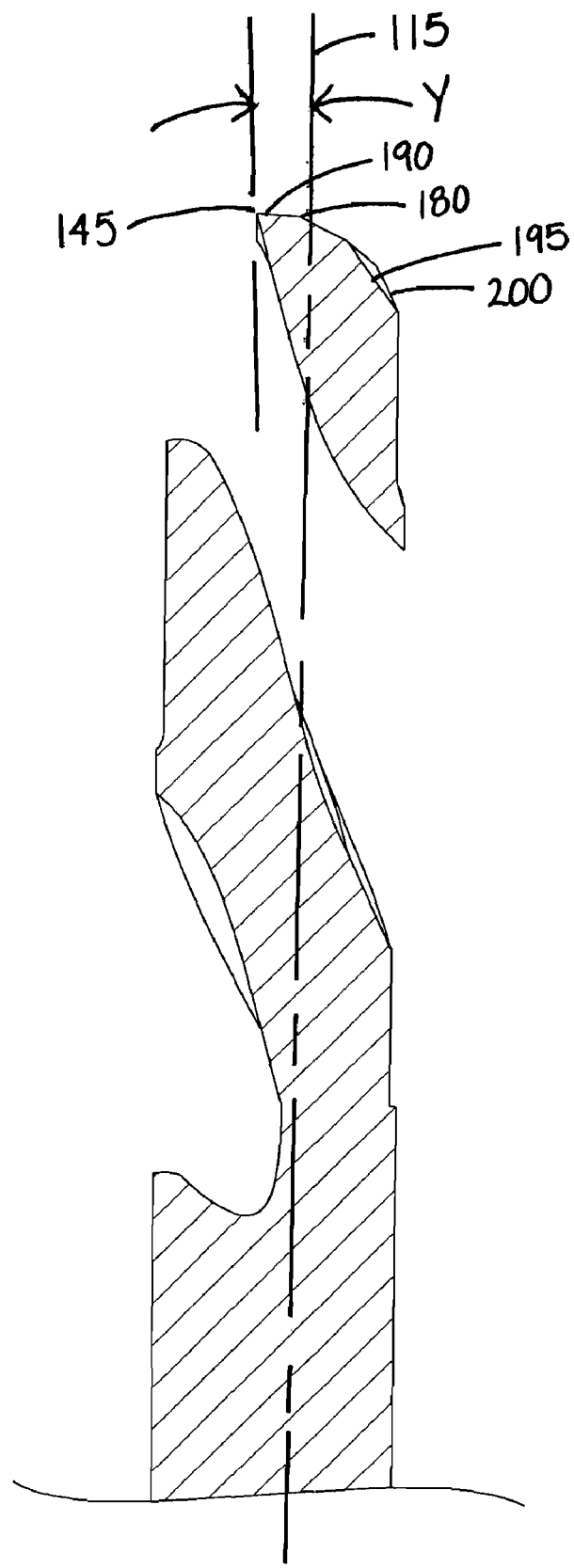
FIG. 8 is a section view along line "8-8" in FIG. 6.

Additionally, FIG. 8 illustrates a section view perpendicular to the primary cutting edge 145 wherein the primary cutting edge 145 has a positive axial rake angle of Y which is dependent upon the helix angle of the flute. For a straight flute, the helix angle will be zero. It should be appreciated that the axial rake angle Y of the primary cutting edge 145 is determined primarily by the formation of the flute 120 along the body 110 of the drill 105.

Directing attention to FIG. 6, of particular interest with respect to the subject invention is the transition region between the primary cutting edge 145 and the secondary cutting edge 150. As mentioned in the prior art, the transition between these two cutting edges oftentimes produced a sharp corner or a discontinuity which creates a built-up edge during a machining operation. In accordance with the subject invention, the end segment 130 includes not only a primary cutting edge 145 and a secondary cutting edge 150, but further includes a transition segment 160 with a tertiary cutting edge 155 connecting the primary cutting edge 145 with the secondary cutting edge 150. However, unlike the primary cutting edge 145 which has a positive axial rake angle and a secondary cutting edge which may have either a positive or neutral axial rake angle, the tertiary cutting edge 155 as illustrated in FIG. 9 has a negative axial rake angle Z that may be between minus 5 to minus 15 degrees and preferably approximately minus 10 degrees.

While the primary cutting edge 145 is formed in conjunction with the formation of the flute 120 and the secondary cutting edge 150 is formed with the formation of the gash 152, the tertiary cutting edge 155 to produce a negative axial rake angle Z, in the range of minus 5 to minus 15 degrees, requires a separate grinding operation which produces the transition segment 160 having the tertiary cutting edge 155.

Directing attention to the tertiary cutting edge 155, the periphery 127 of the body 110 defines a drill outside diameter 165 and, as shown in FIG. 6, when viewed from the end 112 of the body 110 the tertiary cutting edge 155 has a radial arc 170 with a radius S of between 5 to 20% of the drill outside diameter 165 and preferably the radius S of the arc 170 is 10% of the outer diameter 165. Additionally, when viewed from the side, as illustrated in FIG. 9, the transition segment 160 may also have an axial arc 175 with a radius T. The formation of the radial arc 170 illustrated in FIG. 6 provides the smooth transition between the primary cutting edge 145 and the secondary cutting edge 150 not provided in the prior art. The axial arc 170 illustrated in FIG. 6 may produce a rake angle Z which, although it is still negative, may vary between 6 and 9 degrees along the length of the axial arc 170.

Figure 9:
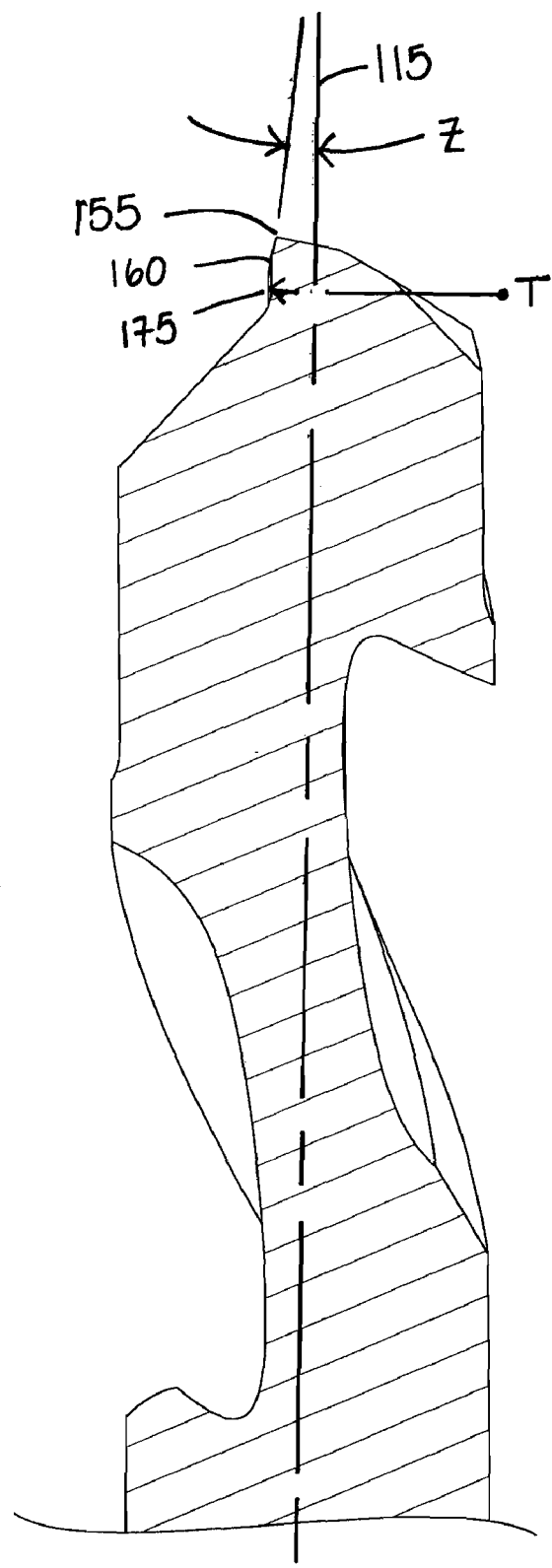
FIG. 9 is section view along line "9-9" in FIG. 6.

Although as illustrated in FIG. 9, the tertiary cutting edge 155 is formed through a grinding operation which produces an axial arc 175, it is also possible to produce a transition segment 160 that is flat and planar (not shown).

As mentioned, the drill 105 rotates in direction R and this will be referred to as the forward rotational direction. Behind each primary cutting edge 145 (FIG. 6) is a clearance 180 which is angled downwardly (away from the chisel edge 135) as it extends away from the primary cutting edge 145 in the direction opposite to the direction of rotation R. The purpose of this clearance 180 is to permit the drill point 125 to engage the workpiece only along the cutting edges without interference by other parts of the drill body 110. The clearance 180 is comprised of at least a flank 185 behind the primary cutting edge 145 and is angled downwardly away from the intended direction of rotation R to provide a first clearance 190 (FIG. 8). Additionally, the clearance 180 may include a clearance face 195 angled to extend away from the primary cutting edge 145 and this clearance face 195 defines a second clearance 200. In the alternative, the clearance 180 may be comprised of a single non-planar relief surface.

Figure 1:
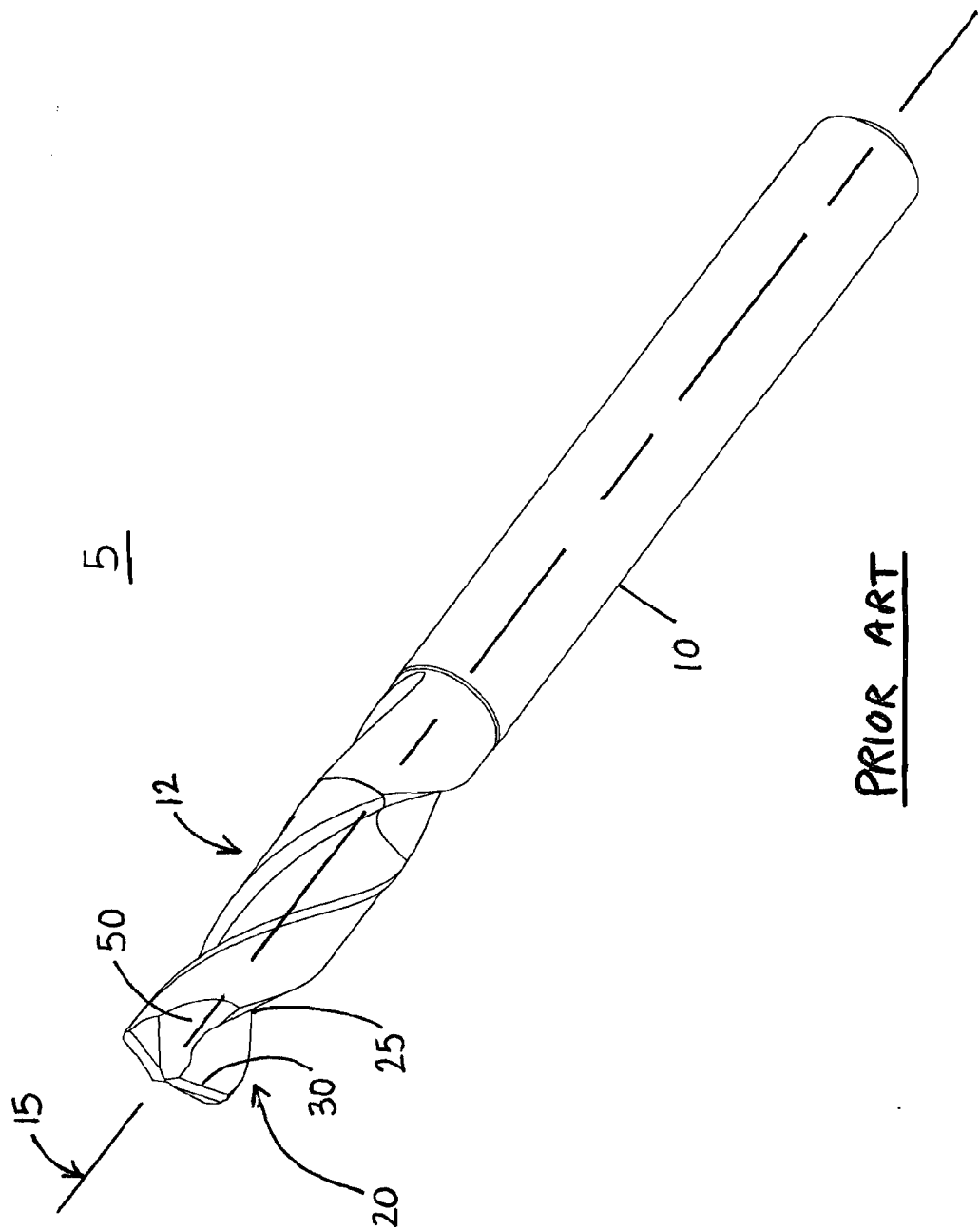
FIG. 1 is prior art and is a perspective view of a twist drill having a conventional drill point.
Figure 2:
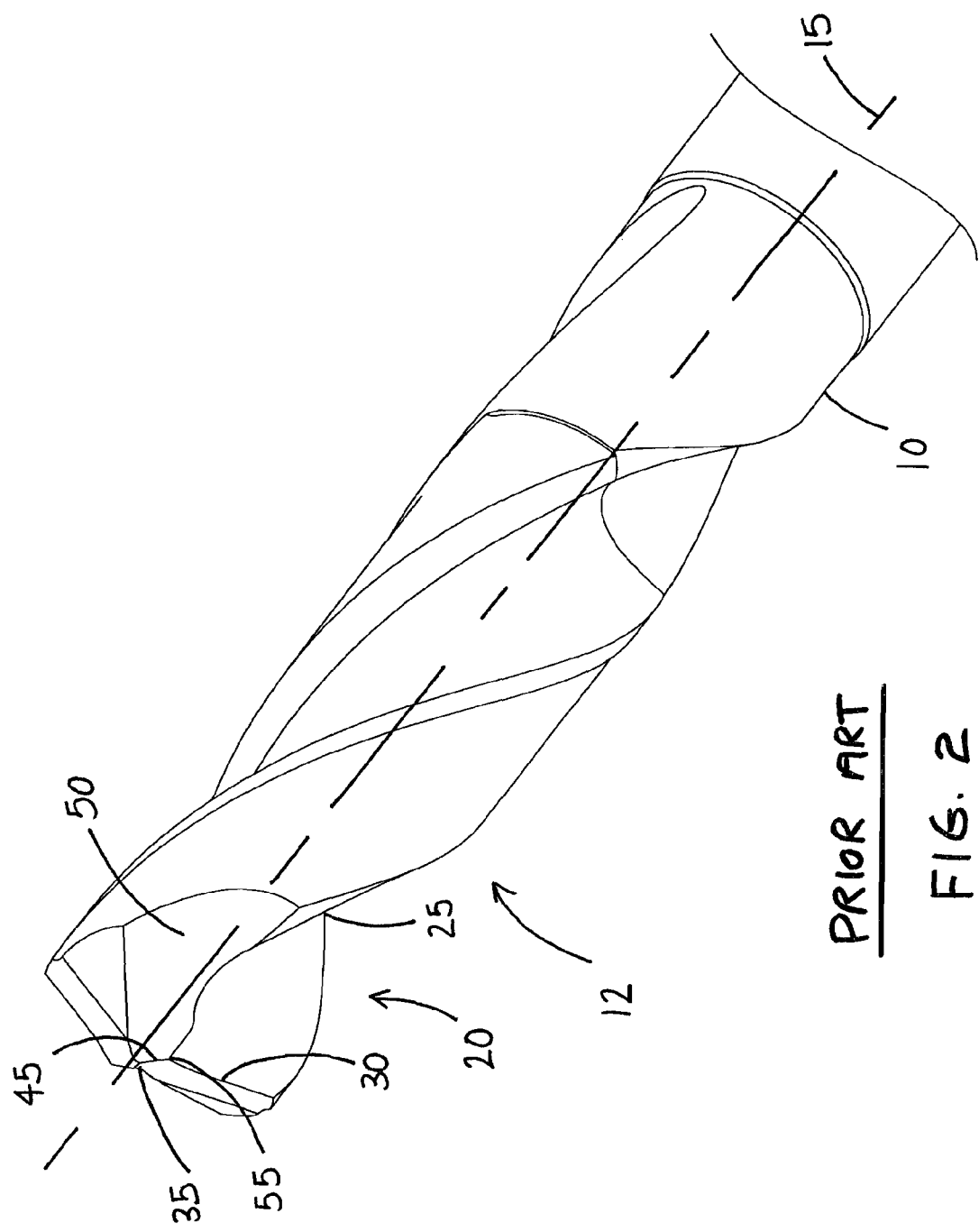
FIG. 2 is an enlarged view of the end of a twist drill illustrated in FIG. 1.
Figure 3:
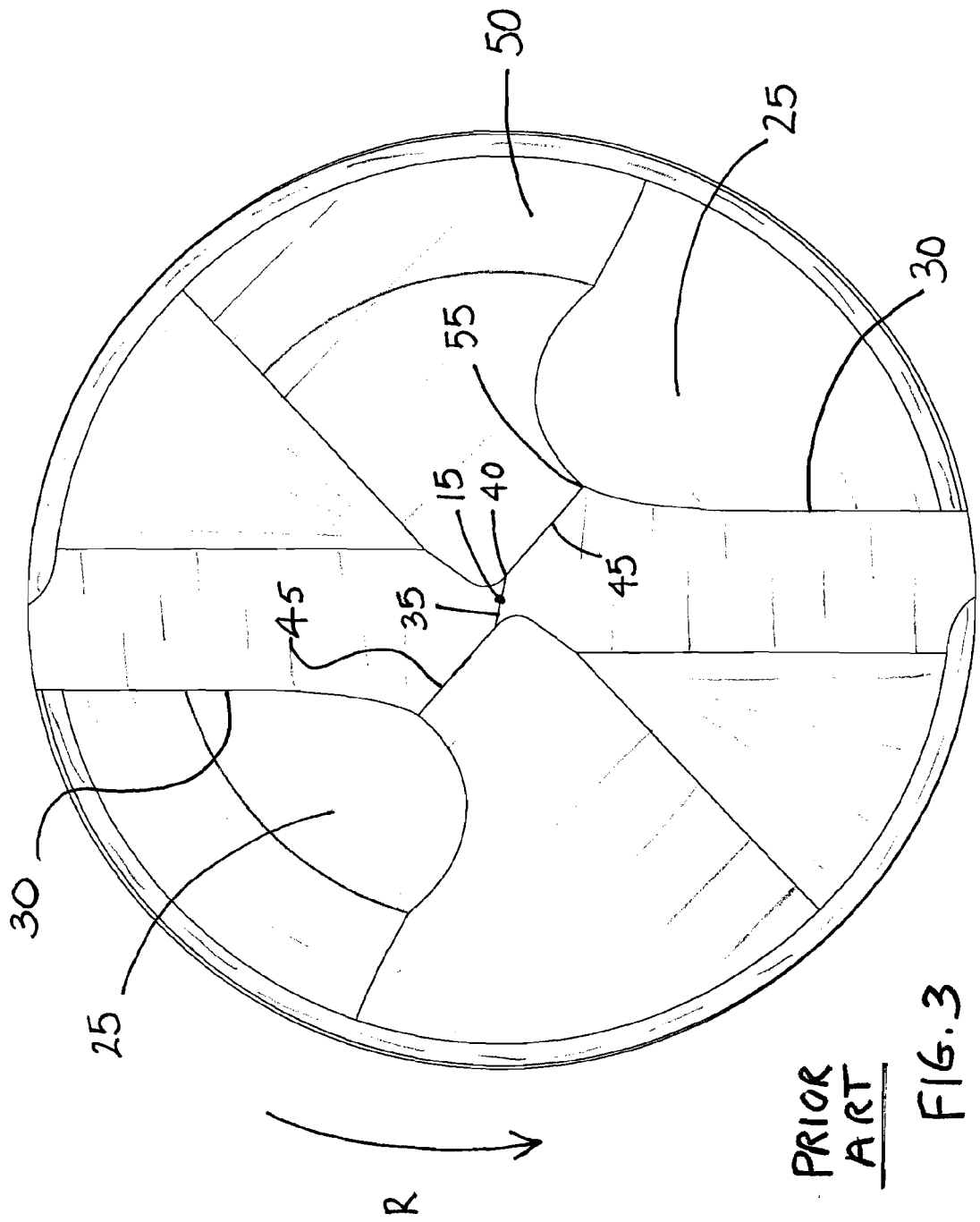
FIG. 3 is an end view of the twist drill illustrated in FIG. 1.

As illustrated in FIG. 3, the drill 105 may have two flutes or in the alternative may have as many as four flutes. Under such circumstances, there will be an end segment 130 associated with each drill flute 120.

The subject invention is also directed to a method for producing a drill 105 having a body 110 extending along a longitudinal axis 115 and having at least one flute 120 extending along the body 110. The drill 105 includes a drill point 125 extending from the end 112 of the body 110 wherein the drill point 125 has a periphery 127 and end segments 130 about the longitudinal axis 115. Each end segment 130 is comprised of a chisel edge 135 extending outwardly from the longitudinal axis 115 to a chisel edge outer corner 140 and includes a primary cutting edge 145 extending inwardly from the periphery 127. The drill point 125 further includes a secondary cutting edge 150 extending outwardly from the chisel edge outer end 140 wherein the secondary cutting edge 150 has a positive or neutral axial rake angle X. The drill point 125 further includes a tertiary cutting edge 155 connecting the primary cutting edge 145 with the secondary cutting edge 150 wherein the tertiary cutting edge 155 has a negative axial rake angle Z. The method for producing such a drill 105 is comprised of the steps of, in a first grinding pass, grinding a gash 152 which forms the axial rake angle X of the secondary cutting edge 150 and in a separate grinding pass, grinding a portion of the secondary cutting edge 150 to produce a tertiary cutting edge 155 having an axial rake angle Y that is negative. In particular, this separate grinding pass involves forming an axial rake angle on the tertiary cutting edge 155 of between minus 5 and minus 15 degrees and preferably approximately minus 10 degrees.

Overall, by providing this tertiary cutting edge 155 with a negative axial rake angle Z and positioned between the primary cutting edge 145 and the secondary cutting edge 150, wherein the secondary cutting edge 150 has a positive rake axial rake angle X, the occurrence of a built-up edge during a machining operation is minimized and the life of the tool is extended.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A drill for making a hole within a workpiece, wherein the drill is comprised of:
   a) a body extending along a longitudinal axis;
   b) at least one flute extending along the body; and
   c) a drill point extending from the end of the body, wherein the drill point has a periphery and end segments about the longitudinal axis; wherein each end segment is comprised of:
      1) a chisel edge extending outwardly from the longitudinal axis to a chisel edge outer end;

2) a primary cutting edge extending inwardly from the periphery;
3) a secondary cutting edge extending outwardly from the chisel edge outer end, wherein the secondary cutting edge has a positive or neutral axial rake angle; and
4) a tertiary cutting edge connecting the primary cutting edge with the secondary cutting edge, wherein the tertiary cutting edge has a negative axial rake angle, and when viewed from the side, the tertiary cutting edge has an axial arc, wherein the axial rake angle along the axial arc has a variation along the axial arc of approximately 6 to 9 degrees.

2. The drill in accordance with claim 1, wherein the axial rake angle of the tertiary cutting edge is between −5 to −15 degrees.

3. The drill in accordance with claim 2, wherein the axial rake angle of the tertiary cutting edge is approximately −10 degrees.

4. The drill in accordance with claim 1, wherein periphery of the body defines a drill outside diameter and when viewed from the end of the body, the tertiary cutting edge has a radial arc with a radius of between 5 to 20 percent of the drill outside diameter.

5. The drill in accordance with claim 4, wherein the radius of the arc is preferably 10 percent of the outer diameter.

6. The drill in accordance with claim 1, wherein the secondary cutting edge has an axial rake angle of between 0 to 10 degrees.

7. The drill in accordance with claim 1, wherein the body of the drill has two flutes.

8. The drill in accordance with claim 1, wherein the primary cutting edge has an axial rake angle based upon the orientation of the flute.

9. A drill for making a hole within a workpiece, wherein the drill is comprised of:
a) a body extending along a longitudinal axis;
b) at least one flute extending along the body; and
c) a drill point extending from the end of the body, wherein the drill point has a periphery and end segments about the longitudinal axis; wherein each end segment is comprised of:
1) a chisel edge extending outwardly from the longitudinal axis to a chisel edge outer end;
2) a primary cutting edge extending inwardly from the periphery;
3) a secondary cutting edge extending outwardly from the chisel edge outer end, wherein the secondary cutting edge has a positive or neutral axial rake angle;
4) a tertiary cutting edge connecting the primary cutting edge with the secondary cutting edge, wherein the tertiary cutting edge has a negative axial rake angle; and
5) a clearance behind the primary cutting edge, the clearance comprising:
a flank behind the primary cutting edge, the flank being angled to extend away from the chisel edge toward the body and define a first clearance, and
a clearance face behind the flank, the clearance face being angled to extend away from the chisel edge toward the body and define a second clearance.

\* \* \* \* \*